INVENTOR.
CHARLES W. SOSINSKI
BY
ATTORNEY

Feb. 2, 1971 C. W. SOSINSKI 3,560,910

MODULE

Filed Aug. 5, 1968 4 Sheets-Sheet 2

INVENTOR.
CHARLES W. SOSINSKI

BY

ATTORNEY

INVENTOR.
CHARLES W. SOSINSKI

BY

ATTORNEY

Feb. 2, 1971 C. W. SOSINSKI 3,560,910

MODULE

Filed Aug. 5, 1968 4 Sheets-Sheet 4

INVENTOR.
CHARLES W. SOSINSKI

BY David ...

ATTORNEY 3,560,910
Patented Feb. 2, 1971

3,560,910

MODULE

Charles William Sosinski, Linden, N.J., assignor to Thomas & Betts Corporation, Elizabeth, N.J., a corporation of New Jersey Filed Aug. 5, 1968, Ser. No. 750,265
Int. Cl. H01r 9/08
U.S. Cl. 339—217 10 Claims

ABSTRACT OF THE DISCLOSURE

The disclosure is directed to the construction of a module employed in a rear release type of connection system. More particularly the disclosure is directed to the manner of mounting and electrically and mechanically interconnecting metallic spring retaining sleeves with the male connector pin to retain the spring sleeve within the bore of an insulating module block and to retain the entire assembly comprising the spring retaining sleeve, the male connector and the various bus bars within the overall module. Various methods are described and disclosed for providing the mechanical and electrical connection between the male connector pin and the spring retaining sleeve to retain both within the module.

RELATED APPLICATIONS (1) Module Mounting System, by Charles W. Sosinski, Ser. No. 724,033, filed Apr. 25, 1968.

(2) Module Extraction Tool, by Charles W. Sosinski, Ser. No. 731,671, filed Apr. 26, 1968.

BACKGROUND OF THE INVENTION

Field of the invention

The invention is directed to the field of interconnecting and terminating electrical conductors and components. Due to the increased complexity of modern electronic equipment, and the need to be able to service it from a given position when it is permanently mounted, such that one face of the equipment is not accessable, it is necessary to provide connector systems which are both serviceable from a given face and which can handle a number of connections and components in a minimum amount of space. Connectors, of this type, are required in such situations as shipboard or aircraft mounted equipment or any other type of equipment requiring high density connections with ease of service.

Description of the prior art

Prior art modules of the general type described above, have spring retaining sleeves permanently or semi-permanently mounted in the bores of the insulating module block which can not be removed, or could only be removed, with great difficulty or possible destruction of the component connector. In certain of the prior art devices the bores of the insulating module block of the connector are provided with retaining shoulders to define a cavity for receipt therebetween of the spring retaining sleeve. The sleeve has to be deformed in order to by-pass the retainer into the cavity and expanded to fill the cavity and thus be trapped between the retaining shoulders defining the cavity. A failure of the sleeve to properly expand, or overexpansion of the sleeve, would cause a poor connection between the male and female contact pins. It might even prevent entrance of the male and female contact pins into the retaining sleeve. Other approaches require a single retaining stop to define one portion of the cavity and required the sleeve to be spun over at its opposite end to seal it within the cavity. This required additional tools, at the time of installation, and might produce a rough burred edge which would be destructive of the conductors and pins being placed within the module.

SUMMARY OF THE INVENTION

The present invention seeks to overcome the difficulties noted above with respect to prior art modules providing a module system wherein strong mechanical interconnection is achieved between the components thereof and the spring retaining sleeve is maintained within the bore of the insulating module block without the requirement for spinning over of an end of the retaining sleeve or the requirement for retaining shoulders within the bore. This is accomplished by means of interconnecting the male contact pin with the spring retaining sleeve such that good mechanical and electrical interconnection is accomplished and further by sealing the assembled spring retaining sleeve and male connector pin into the insulating module block by means of seals placed over bus bars which interconnect various male connector pins and which also provide hermetic sealing for the assembled connector. In the connector, an insulating module block has at least one bore therethrough from a front face to a rear face thereof. Placed within the bore is a spring retaining sleeve and then coupled thereto is the male connector pin which provides electrical and mechanical coupling between the retaining sleeve and the male connector pin. Further, various male connector pins, as are required, are interconnected by means of bus bars. The entire assembly is then hermetically sealed to protect the connector and to prevent removal of the assembled male connector pins and spring retaining sleeves. It is therefore an object of this invention to provide an improved form of module.

It is yet another object of this invention to provide an improved form of module wherein the spring retaining sleeve and male connector pins are interconnected, both mechanically and electrically.

It is yet another object of this invention to provide an improved module wherein the male connector pin and spring retaining member are mechanically and electrically assembled wherein removal of the spring retaining sleeve and male connector pin is prevented, by means of seals.

It is another object of this invention to provide a module wherein the spring retaining sleeve and male connector pin are retained within the bore of insulated housing without requirement for construction details on the insulating module block or within the bores of the insulating module block.

It is still another object of this invention to provide an improved module wherein the connection between the spring retaining sleeve and the male connector pin can be produced prior to installation of the spring retaining sleeve and male connector pin with the bores of an insulating module block or after installation of the spring retaining sleeve within the bores of the insulating housing.

It is yet another object of this invention to provide a module wherein the male connector pin and interconnecting bus bars are unitary in construction.

It is still another object of this invention to provide an improved module wherein the male connector pin and interconnecting bus system can be made integral with the spring retaining sleeve and all components retained within the bore of an insulating housing by means of externally applied seals.

Other objects and features of the invention will be pointed out in the description and claims and illustrated in the accompanying drawings, which disclose, by way of example, the principles of the invention and the best modes which have been contemplated for carrying them out.

BRIEF DESCRIPTION OF THE DRAWING

In the drawings.

Similar elements will be given similar reference characters in each of the respective figures.

DESCRIPTION OF THE PREFERRED EMBODIMENT

Figure 1:
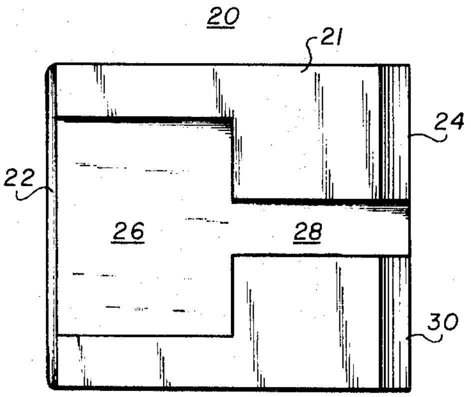
FIG. 1 is a side elevation of a module constructed in accordance with the concepts of the invention.
Figure 2:
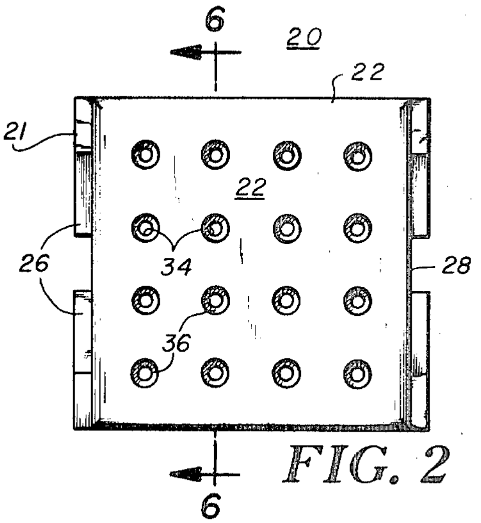
FIG. 2 is a front view of a module of FIG. 1.
Figure 3:
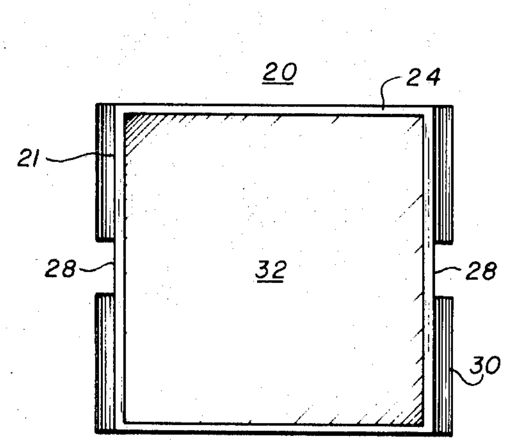
FIG. 3 is a rear view of the module of FIG. 1.
Figure 4:
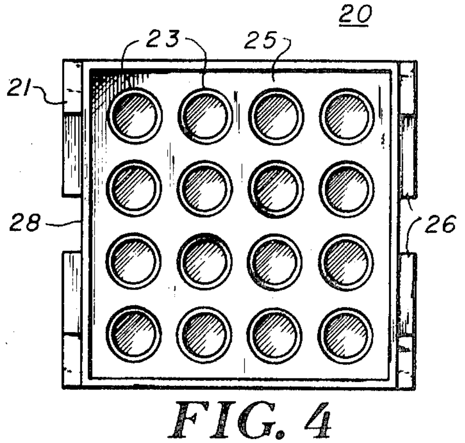
FIG. 4 is a front elevation of the module of FIG. 2 with the front seals removed therefrom.
Figure 5:
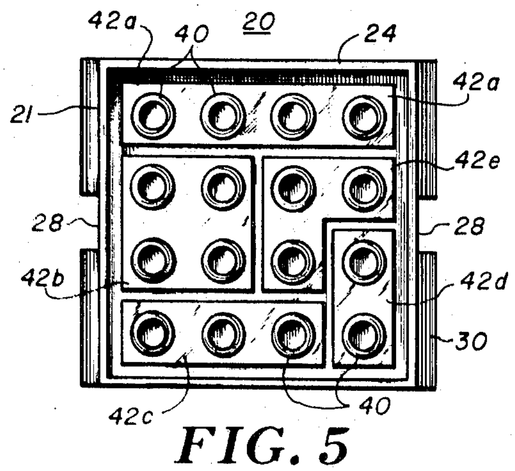
FIG. 5 is a rear elevation of the module, as shown in FIG. 3, with the rear seals removed to illustrate additional details thereof.

Turning now to FIGS. 1 to 5 there is shown the external details of a module 20 constructed in accordance with the concepts of the invention, and further illustrated and described in application No. 1 cited above and incorporated herein by reference. Module 20 has a body portion 21 having a rear face seal 22 and a front face 24. Extending from the rear face seal 22 into the body portion 21, on the outer surface, is a large recess 26 which then communicates with a smaller recess 28 extending to the front face 24. The front face 24 is chamfered as at 30. Extending through the body 21 are a plurality of bores 23 which extend from the rear face 25 to the front face 24. The rear face 25 is recessed with respect to the outer edges of the body 21. This will permit the receipt and the holding of the rear face seal 22 as is shown in FIG. 1. In FIG. 2 the front face seal 22 is shown in position and provides a plurality of sealing apertures 34 aligned with the bores 23 in the body 21 of the connector 20. Deformable collars 36 fit about each of the apertures 34 so that the deformable collar 36 will be deflected upon the insertion of the connector pin, or tool, or both and will be permitted to return about a connector pin placed within the aperture 34 such to provide a seal thereabout. As is shown in FIG. 3, the front face seal 32 is placed within the front face 24 such as to seal the front face 24 of the connector 20. Upon removal of the front face seal 32 the bus bar arrangement of the module can be seen, as is shown in FIG. 5. A plurality of male connector pins 40 extend through the bores 23 and are terminated in interconnecting bus bars 42. It should be noted that the designations front and rear are arbitrary in their choice and are in accordance with terminology normally accepted in the connector art. The terms are relative and may be used interchangeably with other designations. As is illustrated in FIG. 5, bus bar **42*a* couples four male connector pins 40 in a straight line pattern. Bus bar 42*b* connects four connector pins 40 arranged in a block pattern. Bus bars 42*c* and 42*d* connect three and two connector pins 40, respectively, mounted in straight line arrangements whereas bus bar 42*e* connects male connector pins 40 in an L-shaped arrangement. It should be understood that any arrangement that may be desired for interconnecting the male connector pins 40 may be accomplished merely by properly shaping and providing the proper size bus bar 40. This may extend from one bus bar to cover all of the shown male connector pins 40 to individual couplings of two male connector pins 40** as is desired.

Figure 6:
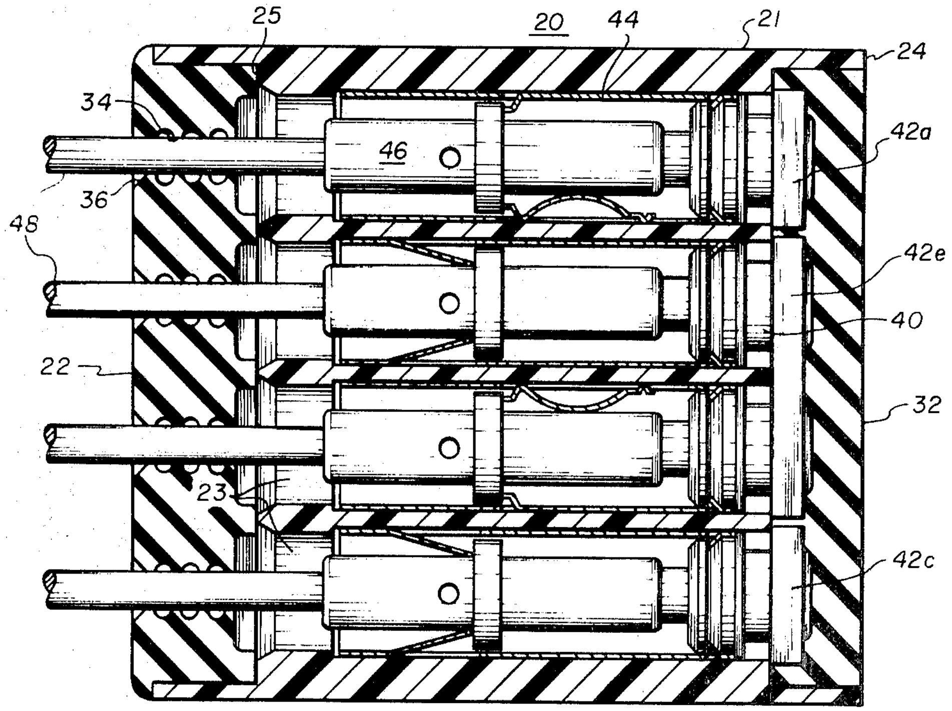
FIG. 6 is a side elevation, partially in section, of the module of FIG. 2 taken along the lines 6—6.

Turning now to FIG. 6 there is shown a side elevation, partially in section, taken along the lines 6—6 of FIG. 2. This figure illustrates the details of module 20 and the manner of interconnecting the various components thereof. As is shown in FIG. 6 there is a module 20 fully assembled and having the various components placed therein. Placed within the cavities 23 of the insulating module body 21 are a plurality of spring retaining sleeves 44, one for each cavity 23. It should be noted that the orientation of the various spring retaining sleeves 44 is not uniform throughout. Such uniformity is not necessary in that the spring retaining sleeves 44 will function equally well regardless of the manner of orientation of the sleeve 44 with respect to the cavity 23. Further, coupled to the spring retaining sleeve 44 are the male connector pin 40 which in turn are coupled in various manners to the interconnecting bus bar 42. The entire assembly is sealed at the front face 24 by means of the front face seal 32. Also inserted within the spring retaining sleeve 44 are female connector pins 46 which have been inserted through the apertures 34 in the rear face seal 22 and thence into the cavities 23 and the spring retaining sleeves 44. Coupled to each of the female connector pins 46 are conductors such as 48.

Figure 7:
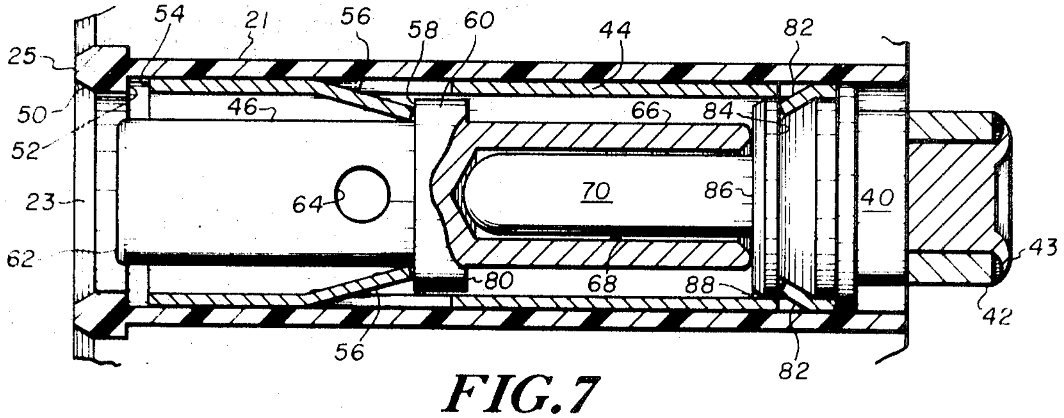
FIG. 7 is a side elevation, in section, of a single bore of the module of FIG. 6, showing in greater detail the interconnecting system.

Turning now to FIG. 7 the details of individual ones of the spring retaining sleeves 44, the male connector pins 40 and the female connector pins 46 can be better appreciated. The leading edge of the cavity 23 at the rear face 25 is chamfered as at 50 for easy insertion of the female contact pin 46 within the cavity 23. A protective lip 52 is provided about the inner surface of the cavity 23 to shield the female connector pin 46 from the edge 54 of the spring retaining sleeve 44. The protective lip 52 will not act to retain the sleeve 44 in position because of the relationship between the spring retaining sleeve 44 and the male connector pin 40 as will be described below. The remaining portion of the bore 23 is straight through to the front face without any additional retaining lips or stops of any type. Struck from the spring retaining sleeve 44 are two or more stops 56 whose free ends will project towards the front face and inwardly with respect to the axial direction of the bore 23. These stops 56 will act to engage the rear portion 58 of the annular ring 60 of the female contact pin 46 to prevent the female contact pin 46 from being removed from the spring retaining sleeve 44. Stops 56 will also act to increase the electrical contact between the sleeve 44 and the female connector pin 46. The initial insertion of the female contact pin 46 into the sleeve 44 will cause the deflection of the stops 56 in an outward direction away from the axial center of the bore 23 to permit the passage of the annular collar 60 of the female connector pin 46 into sleeve 44. However, once the rear portion 58 of the shoulder 60 has passed the free ends of the stops 56 they are permitted to return to their indicated position thus engaging the portion 58 and thus preventing extraction of the female contact pin 46 until such extraction is desired by use of a tool which will cause an outward deflection of the stops 56 and free them from their contact with the portion 58 of the ring 60 of the female contact pin 46.

Figure 8:
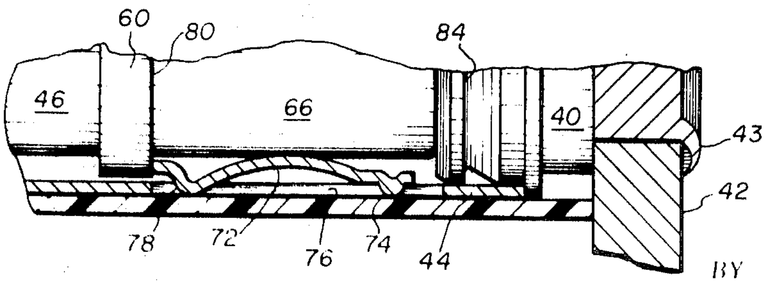
FIG. 8, partially in section, illustrates in top plan view a portion of FIG. 7 with the spring retaining sleeve to illustrate other details thereof.

Portion 62 of the female contact pin 46 contains a hollow recess for acceptance of a conductor such as 48, as shown in FIG. 6. A window 64 is provided to insure that the conductor 48 has been properly positioned within the cavity 62. The front portion 66 of the female contact pin 46 is provided with a further cavity 68 for receipt therein of a male contact pin portion 70. Tolerances will be strictly maintained between the diameter of the cavity 68, of the female contact pin 46 and the projection portion 70 of the male contact pin 40 to insure a good mechanical and electrical joint therebetween. However, to insure that a good electrical and mechanical contact is made, an additional spring element 72, as shown in FIG. 8, is employed. Spring element 72 is generally located at a position 90° from the positions of the stops 56 due to convenience of manufacture and in order to provide maximum sleeve strength and be in a position such that its forces will not be conteracted by the forces exerted by stops 56. Spring 72 will have a large knobbed end 74 at the free end thereof, which knob portion 74 is permitted to ride within the aperture 76 created by the striking out of the spring member 72 from the sleeve portion 44. Struck at the opposite end of the spring member 72 is a stop 78 which will engage the front surface 80 of the annular ring 60 of the female connector 46 and thus act to limit the forward insertion of the female contact pin 46 into sleeve 44 and stabilizes pin 46. Spring 72 will urge the female contact pin portion 66 into engagement with the male contact pin portion 70 and thus insure good mechanical and electrical connection therebetween.

Returning now to FIG. 7, a final set of spring members 82 are struck from the spring retaining sleeve 44 adjacent the front face 24 of the connector 20. These are generally in aligned positions with the stops 56 but not as long. The springs 82 extend rearwardly and inwardly with respect to the axial center of the bore 23. Springs 82 are arranged to engage with the back surface 84 of the collar 86 of the male connector pin 40. Leading edges 88 of the annular collar 86 of the male connector pin 40 cause the displacement outwardly of the spring members 82 until such time as the rear surface 84 of the annular collar 86 is positioned ahead of the free end of the springs 82 at which time they are permitted to return to their initial positions extending inwardly and thus will engage the surfaces 84 of the ring 86 and prevent removal of the male connector pin 40. The opposed forces of springs 82 and stops 56 will tend to keep the male connector pin 40 and the female connector pin 46 united. At this time it should be noted that assembly has been achieved between the male connector pin 40 and the female connector pin 46 and the sleeve 44. However, it is still possible to remove this entire assembly from the bores 23 of the block 21 by pulling the assembly towards the front face thereof. The completion of the assembly is provided by means of bus bars 42 which are used to interconnect the various male connector pins 40 and are connected thereto by spinning over pins 40 as at 43. The bus bars, as shown in section in FIG. 7, are assumed to run in a horizontal direction in a manner shown by bus bars 42*a* or 42*c* of FIG. 5. After this portion of the assembly is completed front face seals 32 are positioned and fixed in place so as to lock the entire assembly within the insulation body 21.

To review the assembly thus far connector insulating body 21, having a plurality of cavities 23 has a spring retaining sleeve 44 inserted in each of the cavities 23 from the front face 24. A male connector pin 40, already assembled to various interconnecting bus bars 42, is inserted from the front face theerof so that the leading chamfered edge 88, of annular collar 86 of the male connector pin 40, will cause deflection outwardly of the spring members 82. On further insertion the chamfered edges 88 will pass the free ends of the spring members 82 permitting their free ends to return to their normal inward position and thus engage the rear surfaces 84 of the annular collar 86 and thus lock male connector pins 40 to the spring retaining sleeve 44. Finally, the female connector pin 46 will be inserted through apertures 34 and into the cavity 23. The leading edges 80 of the shoulder 60 of the female connector pin 46 will cause the outward deflection of the stops 56 and the cavity 68 will be positioned over the portion 70 of the male contact pin 40. The insertion of the female connector pin 46 will continue until the leading edge 80 of the female connector pin shoulder 60 engages the stop 78, at which time further movement of the female connector pin 46 in the forward direction is terminated. Due to the relative sizes and tolerances provided the shoulder 60, of the female connector pin 46, should now have completely passed the free ends of the stops 56 and permit them to return inwardly and thus engage the rear portion 58 of the shoulder 60 and thus prevent the withdrawal of the female contact pin 46 in the rearward direction. The springs 72 will engage the outer surface of the portion 66 of the female contact 46 to insure good mechanical and electrical contact between the portion 70 of the male contact pin 40 and the portion 66 of the female contact 46.

Figure 9:
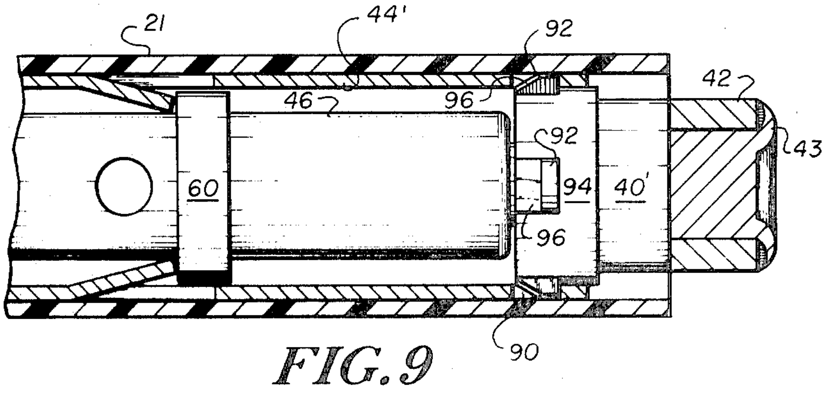
FIG. 9, partially in section, shows a side elevation of an alternative construction of the interconnection system between the spring retaining sleeve and the male connector pin.

Turning now to FIG. 9, another manner of interconnecting the male connector pin 40′ to the spring retaining sleeve 44′ is described. The inwardly extending spring members 82 of FIG. 7 are replaced by slots 90 placed at regular intervals adjacent the front face of the body 21. These slots 90 will be engaged by flange 92 of the male connector pin 40′. Flange 92 does not extend around the entire periphery of the collar 94 but rather is segmented and of a length sufficient to be accommodated within the slots 90. The chamfered front edge 96 of the flanges 92 will permit positioning of the flanges 92 within the slots 90 and thus engage the male connector pin 40′ with the spring retaining sleeve 44′. I should be recalled that sleeve 44′ is rolled from flat stock and has a longitudinal seam. This gives the sleeve 44′ provision to expand as the flanges 92 are brought to slots 90. After flanges 92 are seated in slots 90 the natural resiliency of sleeve 44′ will cause it to close seizing flanges 92 in slots 90.

Figure 10:
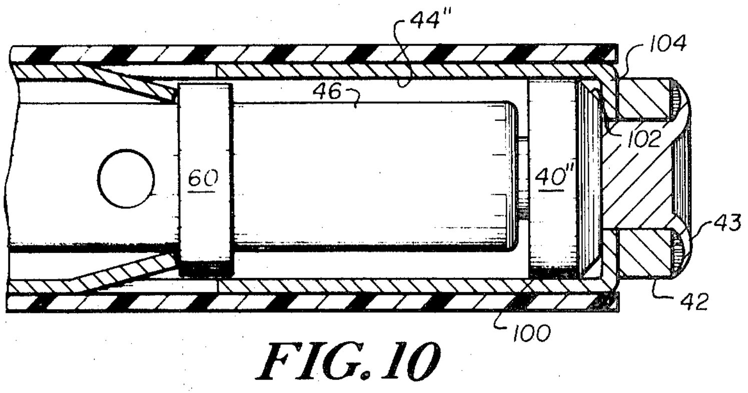
FIG. 10 illustrates a side elevation, partially in section, of a further embodiment of the interconnection system between the spring retaining sleeve and the male connector pin.

Turning now to FIG. 10 there is shown another alternative construction of a spring retaining sleeve 44″ and a male contact pin 40″. In this arrangement the connector pin 40″ has an annular collar 100 having a rear surface 102 for receipt thereof of the spun over portion 104 of the spring retaining sleeve 44″. Employing this type of construction, the male connector pin 40″ is inserted within the spring retaining sleeve 44″ prior to its assembly within the cavity 23 of the insulating body 21 of the connector 20. The free end 104 of the sleeve 44″ may be formed in a turned down direction or may be spun over the male connector pin 40″ after it has been positioned therein. The entire assembly will then be from the front face into the cavity 23 and will be sealed in the manner described above with respect to FIG. 6.

Figure 11:
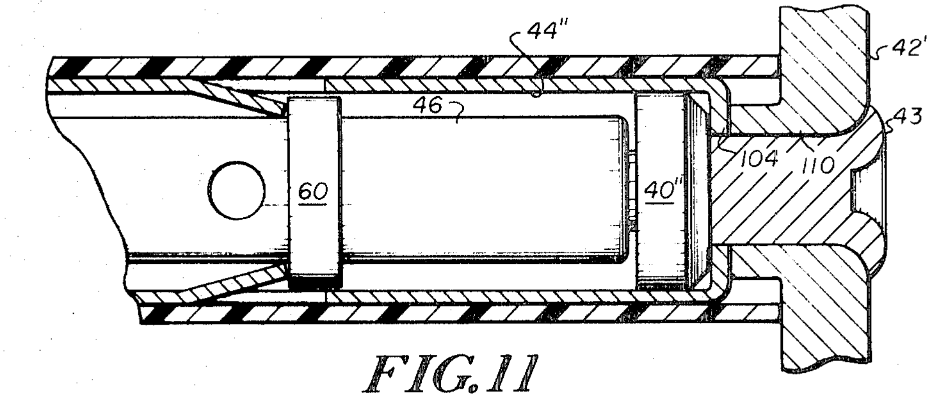
FIG. 11 is a side elevation, partially in section, of a further manner of interconnecting a spring retaining sleeve with the male connector pin.
Figure 12:
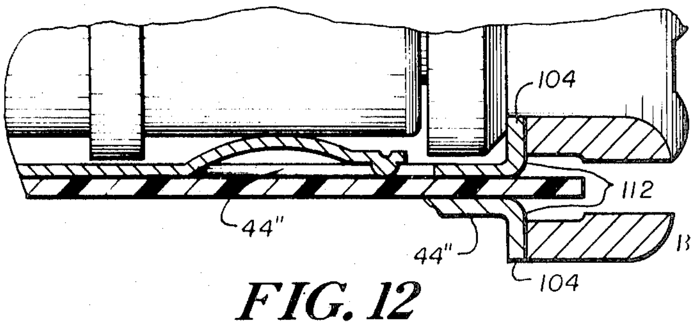
FIG. 12 is a top elevation, partially in section, of a portion of FIG. 11.
Figure 13:
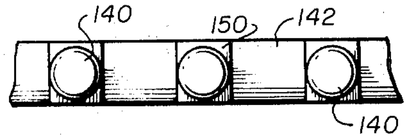
FIG. 13 is a top plan view of an alternative construction of a male connector pin and interconnection bus as illustrated in FIG. 7.

In FIGS. 11 and 12 the bus bar 42′ instead of being flat, as is shown in FIG. 7, rear face of the collar 86 and the spun over portion there is provided a bus bar 42′ of a lesser thickness provided with a raised collar portion 110 so as to effectively separate the bus bar 42′ from the downwardly extending portion 104 of the spring retaining sleeve 44″. As a result of this type of construction of the bus bar 42′ there is an increase in the dielectric path between the turndown portions 104 of adjacent sleeves 44″. The increased path is shown by the path 112, in FIG. 12, which construction permits a closer center to center spacing of adjacent cavities 23.

Figure 14:
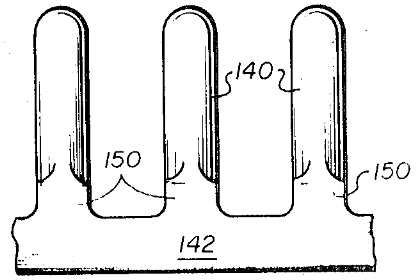
FIG. 14 is a side elevation of the combined interconnection bus and male connector pin of FIG. 13.
Figure 15:
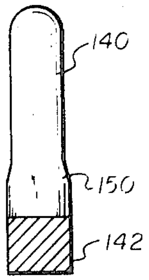
FIG. 15 is a front elevation of the combined interconnection bus and male connector pin of FIGS. 13 and 14.
Figure 17:
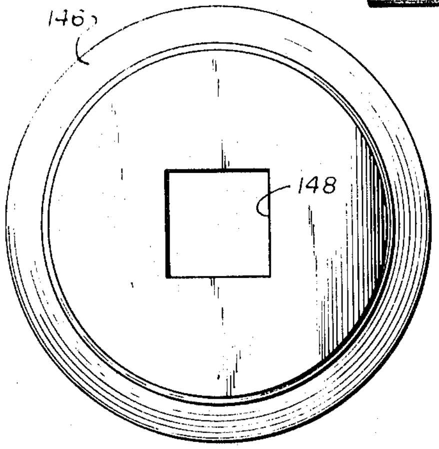
FIG. 17 is a top plan view of the retaining collar of FIG. 16.
Figure 16:
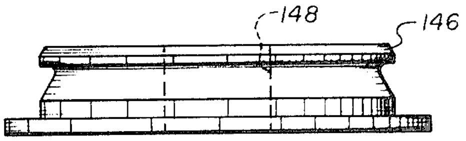
FIG. 16 is a side elevation of a retaining collar to be employed with the combined male connector pin interconnection bus of FIGS. 13, 14 and 15.
Figure 18:
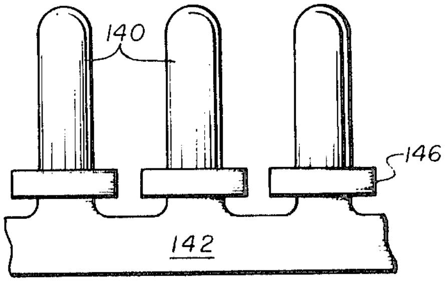
FIG. 18 is a side elevation of the assembled male connector pin interconnection bus of FIGS. 13, 14, and 15 and the retaining ring of FIGS. 16 and 17.

Turning now to FIGS. 13 through 18 there is shown an alternative construction of the male connector pins 140 with the interconnecting bus bar 142. In this instance the connector pins 140 are formed as an integral portion of the interconnecting bus bar 142. Placed atop each one of the male connector pins 140 is a retaining ring 146 having an aperture 148 therethrough. Aperture 148 will be arranged to be received by the shoulder 150 on the male connector pin 140 as is shown in FIG. 14. The retaining ring 146, as is shown in FIGS. 16 and 17, is similar in detail to ring 86, as shown in FIG. 7. Such construction removes the necessity for spinning over the rear portion of the male connector pin 40 as is shown in FIG. 7.

Figure 19:
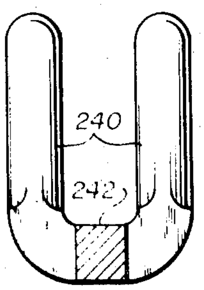
FIG. 19 is a front elevation, partly in section, of an alternative construction of the combined male connector pin and interconnection bus of FIGS. 13, 14, and 15.
Figure 20:
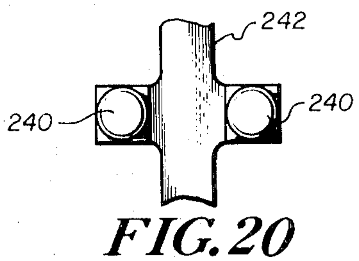
FIG. 20 is a top plan view of the combined male connector pin and interconnection bus of FIG. 19.

Alternatively, arrangements shown in FIGS. 19 and 20 may be employed wherein the connector pins 240 are fabricated in pairs as an integral portion of the interconnecting bus bar 242. Retaining rings, such as 146, shown in FIGS. 16 and 17 will be placed over male connector pins 240 as was described with reference to FIG. 18. After properly positioning these elements, the rear seals and the front face seals 32 will be applied to seal the entire connector 20.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. An electrical connector module comprising: a body having at least one bore from a front face to a rear face thereof; a spring insert positioned in said bore; a single-ended male connector pin consisting of a contact portion and a head portion at one end thereof, said contact portion positioned within said spring insert, said head portion positioned generally adjacent the front face of said body; coupling means generally circumjacent said head portion of said male connector pin independently securing said spring insert in longitudinally bidirectional relationship thereto to prevent separation thereof; and retaining means positioned outwardly of and generally adjacent said front face of said body and secured to said head portion of said male connector pin to limitingly position and rigidly secure said male connector pin and said spring insert accurately within said bore of said body.

2. A module, as defined in claim 1, wherein said coupling means comprises at least one first portion on said spring insert inclined rearwardly and inwardly with respect to the axis of said bore; said portion having a free end to engage said head portion of said male connector pin, the wall defining said bore in said body being in intimate contact with the outer surface of said spring insert, thereby limiting the outward radial deflection thereof and preventing disengagement between said spring insert and said male connector pin.

3. A module, as defined in claim 1, wherein said male connector pin has a shoulder about its outer periphery intermediate its ends; said coupling means comprising an annular ring having an aperture therethrough extending in the direction of said bore, the axial surface of said ring extending inwardly with respect to the axis of said bore; said ring coupled to said spring insert end adjacent to the front face of said body; said axial surface of said annular ring cooperating with said shoulder of said connector pin to prevent separation of said male connector pin and said spring insert.

4. A module, as defined in claim 1, wherein said male connector pin has at least one extending portion generally adjacent said head portion thereof; said coupling means comprising at least one slot in said spring insert, said slot proportioned to receive therein said extending portion of said pin; the wall defining said bore in said body being in intimate contact with the outer surface of said spring insert, thereby limiting the outward radial deflection thereof and preventing disengagement between said spring insert and said male connector pin.

5. A module, as defined in any one of claims 1, 2, 3 and 4 wherein said retaining means comprises: bus bar means engaging the front face of said body and coupled to said head portion of said male connector pin; and sealing means coupled to said body to seal the front face thereof.

6. A module, as defined in any one of claims 1, 2, 3 and 4, further comprising a female connector pin within said spring insert; said female connector pin having a shoulder about its outer periphery intermediate its ends, and an internal cavity to receive therein a portion of said male connector pin; said spring insert having a second portion inclined forwardly and inwardly with respect to the axis of said bore; said second portions adapted to be deflected outwardly to permit placement of said female connector pin within said spring insert and return to their initial positions to engage the shoulder of said female connector pin and prevent its unwanted withdrawal from said spring insert.

7. A module, as defined in any one of claims 1, 2, 3 and 4, wherein said spring insert further comprises an arcuate portion generally extending inwardly to engage a female connector pin inserted within said spring insert and urge said female connector pin into intimate mechanical and electrical contact with said male connector pin.

8. A module, as defined in any one of claims 1, 2, 3 and 4, wherein said spring insert further comprises an arcuate portion generally extending inwardly to engage a female connector pin inserted within said spring insert to assure contact between such female connector pin and said male connector pin; and a stabilizing tab on said spring insert inclined towards said rear face of said body to engage the front face of the shoulder of a female connector pin to limit forward insertion of such female connector pin into said spring insert and prevent such female connector pin from wobbling within said spring insert.

9. An electrical connector module comprising: a body having at least two spaced apart bores extending from a front face to a rear face thereof; at least two spring inserts, one for each of said bores, each positioned in an associated one of said bores; at least two male pins, one for each of said bores; each of said male connector pins having a first portion extending within its associated spring insert adjacent the front face of said body and a second portion engaging said front face of said body; interconnecting means coupling said second portions of said male connector pins, said interconnecting means extending along said front face of said body; said interconnecting means and said second portions cooperating to limit the insertion of said male connector pins into their associated spring inserts; coupling means, one for each of said spring inserts, for coupling each of said spring inserts to its associated male connector pin to prevent separation thereof; and retaining means coupled to said male connector pins to prevent withdrawal of said male connector pins and spring inserts from said bores of said body.

10. A module, as defined in claim 9, wherein each of said male connector pins has shoulders thereabout constructed separately and coupled to its associated male connector pin.

References Cited

UNITED STATES PATENTS

| | | | |
|---|---|---|---|
| 2,923,911 | 2/1960 | Demurjian | 339—217X(S) |
| 2,935,720 | 5/1960 | Lorimer | 339—205X |
| 3,068,443 | 12/1962 | Nava et al. | 339—217(S) |
| 3,200,355 | 8/1965 | Dahlen | 339—217X(S) |
| 3,383,642 | 5/1968 | Nava et al. | 339—205 |
| 3,370,264 | 2/1968 | Kelly et al. | 339—217(S) |
| 3,449,708 | 6/1969 | Lawrence et al. | 339—205 |
| 2,402,578 | 6/1946 | Rollow | 339—205 |

MARVIN A. CHAMPION, Primary Examiner

R. A. HAFER, Assistant Examiner

U.S. Cl. X.R.

339—255